(No Model.)

H. LIEBEL.
SELF CLOSING BRACELET.

No. 332,719. Patented Dec. 22, 1885.

WITNESSES.

Geo W Cady

A. A. Greene

INVENTOR,

Hugo Liebel by Edson Salisbury Jones
Attorney

UNITED STATES PATENT OFFICE.

HUGO LIEBEL, OF NORTH ATTLEBOROUGH, MASSACHUSETTS.

SELF-CLOSING BRACELET.

SPECIFICATION forming part of Letters Patent No. 332,719, dated December 22, 1885.

Application filed July 27, 1880. Serial No. 14,337. (No model.)

*To all whom it may concern:*

Be it known that I, HUGO LIEBEL, of North Attleborough, in the county of Bristol and State of Massachusetts, have invented a new and useful Improvement in Self-Closing Bracelets; and I do hereby declare that the following specification, taken in connection with the accompanying drawings, forming a part of the same, is a full, clear, and exact description thereof.

My invention relates to that class of bracelets to which a spring is applied for the purpose of making the bracelet self-closing.

My improvement consists in mounting the spring in one of the wings or sections of the bracelet, and in providing the adjoining wing with a lip or lever, upon which the spring acts to close the bracelet.

It also consists in arranging said lip or lever so that it will enter and be concealed by the section or wing containing the spring; and it further consists in locating the pivot-joint within the body of the bracelet, so as to leave no projections at the hinge-joint, as will hereinafter appear.

Figure 1:
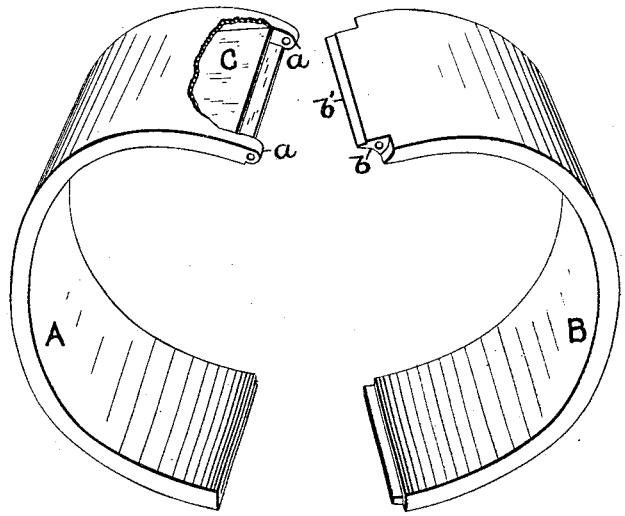
Figure 2:
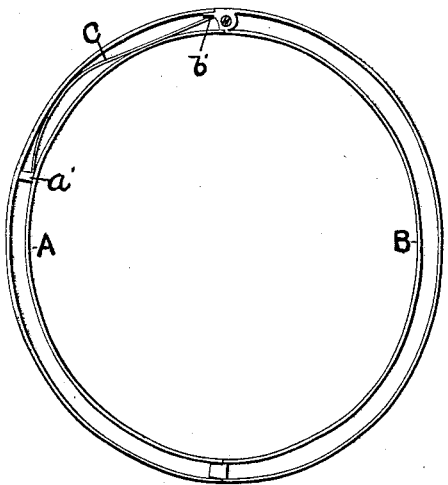
Figure 3:

Referring to the drawings, Figure 1 represents in perspective the two wings disjointed, a portion of one wing being broken away the better to show the outer end of the spring located therein. Fig. 2 shows the bracelet in section when closed; and Fig. 3 represents a portion of the wings in an open position, showing the outer end of the spring depressed.

A B are the bracelet-wings, and C is a flat steel spring located in the wing A. The wing A is provided with two members, $a$, of a hinge-joint, and the wing B with the third member, $b$, the said wings being connected in the usual manner by a pin passing through the joint. The spring C is preferably loosely mounted in the wing which it occupies, its inner end abutting a stop, $a'$, as shown in Fig. 2. The member $b$ of the hinge-joint is provided with a projecting lip, $b'$, which enters the open end of the wing A and overlies the outer end of the spring. The spring is prevented from longitudinal displacement, therefore, by the engagement of its ends with the stop $a'$ and the joint member $b$. If desired, however, the spring may be secured to the wing which it occupies by solder or in any preferred manner. When the bracelet opens, the lip $b'$ depresses the outer end of the spring, as shown in Fig. 3, and the wings are closed by the action of said spring upon the lip $b'$.

In mounting the spring in position and in connecting the wings the spring is simply passed into the open end of the wing A until its inner end abuts the stop $a'$; or it is secured in the wing in any preferred manner. The lip $b'$ is then inserted over the outer end of the spring, the wings are pressed together, and the joint-pin passed through the hinge. It will be observed that the joint-pin passes through the body of the bracelet, so that there are no external projections at the hinge-joint, and that the movement of the wings or sections is limited under the action of the spring by the contact of the inner portions of the wings at the joint when the wings are closed and by the contact of the outer portions of the wings at the joint when the bracelet is opened.

The bracelet presents a close joint at all times, is simple and inexpensive in construction, and the spring is thoroughly effective in its action.

Having described my invention, what I claim, and desire to secure by Letters Patent, is—

1. In a self-closing bracelet or similar article, the combination of hinged sections or wings with a spring mounted and concealed in one of the sections and acting upon a lever on the adjoining section, substantially as and for the purposes specified.

2. In a self-closing bracelet or similar article, the combination of hinged sections or wings with a loosely-mounted spring secured by a stop or rest contained and concealed in one of the wings and abutting against a lever on the adjoining wing, substantially as and for the purposes specified.

3. In a bracelet, ear-ring, or other article of jewelry, the hinged sections connected with each other by a pivot-joint within the body of the article, so as to leave no projections, and combined with a spring at the hinge, concealed and mounted within one of the sections, said parts being so connected that their movement is limited under the action of the spring, substantially as set forth.

4. In a self-closing bracelet or similar article, the combination of a section containing a spring concealed therein, with a second section hinged thereto and provided with a lever which engages the spring, enters the first section, and is concealed thereby, substantially as set forth.

5. In a self-closing bracelet, the combination of the wing A, having a stop, $a'$, the wing B, having its hinged end provided with a projecting lip, $b'$, and a spring, C, loosely mounted in the wing A, with its inner end abutting the stop $a'$ and its outer end underlying the lip $b'$, substantially as described and shown.

HUGO LIEBEL.

Witnesses:
EDSON SALISBURY JONES,
A. A. GREENE.